United States Patent
Huang et al.

(10) Patent No.: US 10,735,069 B2
(45) Date of Patent: Aug. 4, 2020

(54) BEAM TRAINING METHOD AND APPARATUS

(71) Applicant: Huawei Technologies Co., Ltd., Shenzhen (CN)

(72) Inventors: Huang Huang, Chengdu (CN); Sainan Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/023,750

(22) Filed: Jun. 29, 2018

(65) Prior Publication Data
US 2018/0309488 A1 Oct. 25, 2018

Related U.S. Application Data

(63) Continuation of application No. PCT/CN2016/105946, filed on Nov. 15, 2016.

(30) Foreign Application Priority Data

Dec. 31, 2015 (CN) .......................... 2015 1 1031896

(51) Int. Cl.
| | |
|---|---|
| *H04B 7/06* | (2006.01) |
| *H04L 1/16* | (2006.01) |
| *H04B 7/0404* | (2017.01) |
| *H04B 7/08* | (2006.01) |
| *H04L 5/00* | (2006.01) |
| *H04W 16/28* | (2009.01) |

(52) U.S. Cl.
CPC .......... *H04B 7/0617* (2013.01); *H04B 7/0404* (2013.01); *H04B 7/0695* (2013.01); *H04B 7/088* (2013.01); *H04L 1/16* (2013.01); *H04L 5/006* (2013.01); *H04L 5/0048* (2013.01); *H04W 16/28* (2013.01)

(58) Field of Classification Search
CPC .... H04B 7/0617; H04B 7/0695; H04B 7/088; H04L 5/0048; H04L 5/005; H04L 27/2675
See application file for complete search history.

(56) References Cited

U.S. PATENT DOCUMENTS

| | | | | |
|---|---|---|---|---|
| 2006/0274679 A1* | 12/2006 | Khandekar | ........... | H04L 5/0026 370/278 |
| 2010/0098042 A1* | 4/2010 | Dent | ...................... | H04B 1/707 370/342 |

(Continued)

FOREIGN PATENT DOCUMENTS

| | | |
|---|---|---|
| CN | 102035783 A | 4/2011 |
| CN | 102257737 A | 11/2011 |

(Continued)

*Primary Examiner* — Ayaz R Sheikh
*Assistant Examiner* — Debebe A Asefa
(74) *Attorney, Agent, or Firm* — Leydig, Voit & Mayer, Ltd.

(57) ABSTRACT

A beam training method includes: determining, by a terminal device, to send n pilot sequences to a network device by using n beams in n timeslots within one uplink beam training period, where the n pilot sequences are at least partially different, and n is a positive integer greater than 1; and sending, by the terminal device, the determined n pilot sequences to the network device by using the n beams in the n timeslots within the uplink beam training period.

20 Claims, 7 Drawing Sheets

(56) References Cited

U.S. PATENT DOCUMENTS

| | | | |
|---|---|---|---|
| 2010/0210219 A1 | 8/2010 | Stirling-Gallacher et al. | |
| 2012/0106474 A1 | 5/2012 | Wu et al. | |
| 2013/0272220 A1 | 10/2013 | Li et al. | |
| 2014/0016573 A1 | 1/2014 | Nuggehalli et al. | |
| 2014/0098912 A1 | 4/2014 | Yin et al. | |
| 2014/0177607 A1 | 6/2014 | Li et al. | |
| 2014/0341048 A1* | 11/2014 | Sajadieh | H04L 5/0085 370/252 |
| 2015/0207602 A1 | 7/2015 | Yang et al. | |
| 2015/0280802 A1* | 10/2015 | Thomas | H04L 27/2636 370/312 |
| 2015/0382370 A1* | 12/2015 | Zhang | H04L 1/1858 455/450 |

FOREIGN PATENT DOCUMENTS

| | | |
|---|---|---|
| CN | 103095627 A | 5/2013 |
| CN | 104113496 A | 10/2014 |
| CN | 104734754 A | 6/2015 |
| CN | 104734805 A | 6/2015 |
| CN | 105940618 A | 9/2016 |

\* cited by examiner

BEAM TRAINING METHOD AND APPARATUS

CROSS-REFERENCE TO RELATED APPLICATIONS

This application is a continuation of International Application No. PCT/CN2016/105946, filed on Nov. 15, 2016, which claims priority to Chinese Patent Application No. 201511031896.0, filed on Dec. 31, 2015. The disclosures of the aforementioned applications are hereby incorporated by reference in their entireties.

TECHNICAL FIELD

Embodiments of the present invention relate to the communications field, and in particular, to a beam training method and an apparatus.

BACKGROUND

As mobile terminals increase, a user equipment (UE) has increasing data volume requirements. Currently, bandwidth of a frequency band lower than 6 GHz is no longer sufficient to meet increasing requirements on communication performance. Therefore, using a high frequency band having rich bandwidth resources as a frequency for backhaul and access will become a trend. The high frequency band is a frequency band higher than 6 GHz, for example, 30 GHz to 300 GHz, or higher.

However, compared with a frequency band lower than 6 GHz, one of obvious characteristics of a high frequency band is high path loss. To ensure a propagation distance, a high frequency beam needs to be relatively narrow. However, coverage of a narrow beam system is limited. Therefore, to obtain an antenna gain as much as possible, narrow beam scanning and alignment need to be performed between a network device and a terminal device, thereby implementing normal communication between the network device and the terminal device.

To implement narrow beam scanning and alignment, beam training needs to be performed. In a beam training phase, a BS (base station) allocates a different training sequence to each UE. However, training sequences are limited. Assuming there are 10 sequences, a maximum of 10 UEs can be simultaneously beam-trained. If there are 50 UEs needing to be trained, the 50 UEs need to be separately trained in five different time periods. Because one of main high-frequency scenarios is a user-intensive scenario, overheads of beam training are relatively high.

SUMMARY

Embodiments of the present invention provide a beam training method and an apparatus, to reduce overheads of beam training and increase efficiency.

Technical solutions are as follows:

According to a first aspect, an embodiment of the present invention provides a beam training method, including:

determining, by a terminal device, n pilot sequences, where the n pilot sequences are at least partially different, and n is a positive integer greater than 1; and sending, by the terminal device, the determined n pilot sequences to a network device by using n beams in n timeslots within one uplink beam training period.

Optionally, the terminal device receives pilot sequence information and timeslot information that are sent by the network device, where the pilot sequence information is information about a pilot sequence that is in the n pilot sequences and that is received by the network device, and the timeslot information is information about a timeslot in which the pilot sequence corresponding to the pilot sequence information is sent.

Optionally, when the n pilot sequences are partially different, pilot sequences sent in some of the n timeslots are the same.

Optionally, the method further includes: receiving, by the terminal device, resource information sent by the network device, where the resource information is a resource allocated for a beam corresponding to the timeslot information.

Optionally, the method further includes: determining, by the terminal device, an optimal transmit beam based on the pilot sequence information and the timeslot information; and sending, by the terminal device by using the optimal transmit beam, identification information of the terminal device to the network device on a resource corresponding to the resource information.

Optionally, determining the n pilot sequences includes: receiving, by the terminal device, information about the n pilot sequences that is sent by the network device, and determining the n pilot sequences based on the received information about the n pilot sequences.

Optionally, if the network device receives a plurality of pilot sequences, the pilot sequence information is information about a pilot sequence having highest received energy in the received pilot sequences or information about all the received pilot sequences.

According to a second aspect, an embodiment of the present invention provides a beam training method, including:

receiving, by a network device, in n timeslots within one uplink beam training period, a pilot sequence sent by a terminal device; and sending, by the network device, pilot sequence information and timeslot information to the terminal device, where the pilot sequence information is information about a pilot sequence that is in n pilot sequences sent by the terminal device and that is received by the network device, the timeslot information is information about a timeslot in which the pilot sequence corresponding to the pilot sequence information is sent, the n pilot sequences are at least partially different, and n is a positive integer greater than 1.

Optionally, when the n pilot sequences are partially different, pilot sequences sent in some of the n timeslots are the same.

Optionally, the n pilot sequences are n pilot sequences randomly selected by the terminal device; or the n pilot sequences are n pilot sequences that are determined by the terminal device based on a pilot sequence combination selected by the terminal device from a preset set of pilot sequence combinations.

Optionally, the network device sends resource information to the terminal device, where the resource information is a resource allocated for a beam corresponding to the timeslot information.

Optionally, the network device receives identification information of the terminal device sent by the terminal device on a resource corresponding to the resource information by using an optimal beam, where the optimal beam is a beam determined by the terminal device based on the pilot sequence information and the timeslot information.

Optionally, the network device randomly selects the n pilot sequences; or the network device selects a pilot sequence combination from a preset set of pilot sequence combinations, and determines the n pilot sequences based on the selected pilot sequence combination; and the network device notifies the user equipment of information about the n pilot sequences.

Optionally, if the network device receives a plurality of pilot sequences, the pilot sequence information is information about a pilot sequence having highest received energy in the received pilot sequences or information about all the received pilot sequences.

According to a third aspect, an embodiment of the present invention provides a terminal device, including:

a processing unit, configured to determine n pilot sequences, where the n pilot sequences are at least partially different, and n is a positive integer greater than 1; and a sending unit, configured to send the determined n pilot sequences to a network device by using n beams in n timeslots within one uplink beam training period.

Optionally, a receiving unit is configured to receive pilot sequence information and timeslot information that are sent by the network device, where the pilot sequence information is information about a pilot sequence that is in the n pilot sequences and that is received by the network device, and the timeslot information is information about a timeslot in which the pilot sequence corresponding to the pilot sequence information is sent.

Optionally, pilot sequences sent in some of the n timeslots are the same.

Optionally, the receiving unit is configured to receive resource information sent by the network device, where the resource information is a resource allocated for a beam corresponding to the timeslot information.

Optionally, the processing unit is configured to determine an optimal transmit beam based on the pilot sequence information and the timeslot information; and the sending unit is configured to send, by using the optimal transmit beam, identification information of the terminal device to the network device on a resource corresponding to the resource information.

Optionally, the receiving unit is configured to receive information about the n pilot sequences that is sent by the network device; and the processing unit is configured to determine the n pilot sequences based on the received information about the n pilot sequences.

Optionally, if the network device receives a plurality of pilot sequences, the pilot sequence information is information about a pilot sequence having highest received energy in the received pilot sequences or information about all the received pilot sequences.

According to a fourth aspect, an embodiment of the present invention provides a network device, including:

a receiving unit, configured to receive, in n timeslots within one uplink beam training period, a pilot sequence sent by the terminal device; and a sending unit, configured to send pilot sequence information and timeslot information to the terminal device, where the pilot sequence information is information about a pilot sequence that is in n pilot sequences sent by the terminal device and that is received by the network device, the timeslot information is information about a timeslot in which the pilot sequence corresponding to the pilot sequence information is sent, the n pilot sequences are at least partially different, and n is a positive integer greater than 1.

Optionally, when the n pilot sequences are partially different, pilot sequences sent in some of the n timeslots are the same.

Optionally, the n pilot sequences are n pilot sequences randomly selected by the terminal device; or the n pilot sequences are n pilot sequences that are determined by the terminal device based on a pilot sequence combination selected by the terminal device from a preset set of pilot sequence combinations.

Optionally, the sending unit is configured to send resource information to the terminal device, where the resource information is a resource allocated for a beam corresponding to the timeslot information.

Optionally, the receiving unit is configured to receive identification information of the terminal device sent by the terminal device on a resource corresponding to the resource information by using an optimal beam, where the optimal beam is a beam determined by the terminal device based on the pilot sequence information and the timeslot information.

Optionally, the device further includes: a processing unit, configured to: randomly select the n pilot sequences; or select, a pilot sequence combination from a preset set of pilot sequence combinations, and determine the n pilot sequences based on the selected pilot sequence combination, where the sending unit is configured to notify the user equipment of information about the n pilot sequences.

Optionally, if the network device receives a plurality of pilot sequences, the pilot sequence information is information about a pilot sequence having highest received energy in the received pilot sequences or information about all the received pilot sequences.

According to a fifth aspect, an embodiment of the present invention provides a beam training method, including:

determining, by a terminal device, a transmit beam; and sending, by the terminal device, n pilot sequences to a network device by using the determined transmit beam in n timeslots within one uplink transmission/receiving beam training period, where the n pilot sequences are at least partially different, and n is a positive integer greater than 1.

Optionally, when the n pilot sequences are partially different, pilot sequences sent in some of the n timeslots are the same.

According to a sixth aspect, an embodiment of the present invention provides a beam training method, including:

receiving, by a network device, by using n receive beams in n timeslots within one uplink transmission/receiving beam training period, n pilot sequences sent by a terminal device, where the n pilot sequences are at least partially different, and n is a positive integer greater than 1; and determining, based on strengths of signals of the received pilot sequences, an optimal receive beam corresponding to the terminal device.

Optionally, when the n pilot sequences are partially different, pilot sequences sent in some of the n timeslots are the same.

According to a seventh aspect, an embodiment of the present invention provides a terminal device, including: a processing unit, configured to determine a transmit beam; and a sending unit, configured to send n pilot sequences to a network device by using the determined transmit beam in n timeslots within one uplink transmission/receiving beam training period, where the n pilot sequences are at least partially different, and n is a positive integer greater than 1.

According to an eighth aspect, an embodiment of the present invention provides a network device, including: a receiving unit, configured to receive, by using n receive beams in n timeslots within one uplink transmission/receiving beam training period, n pilot sequences sent by a terminal device, where the n pilot sequences are at least partially different, and n is a positive integer greater than 1; and a processing unit, configured to determine, based on strengths of signals of the received pilot sequences, an optimal receive beam corresponding to the terminal device.

In the embodiments of the present invention, within the uplink beam training period, the pilot sequences sent by the terminal device by using the n beams in the n timeslots to the network device are not exactly the same. Provided that pilot sequences sent in n timeslots within a same uplink beam training period by different terminal devices are not exactly the same, the network devices can distinguish the different terminal devices. In addition, a quantity of combinations between different pilot sequences and the n timeslots is greater than a quantity of the pilot sequences. In this way, within a same uplink beam training period, more terminal devices can be beam-trained. Therefore, overheads of beam training are reduced.

DESCRIPTION OF EMBODIMENTS

Figure 1:
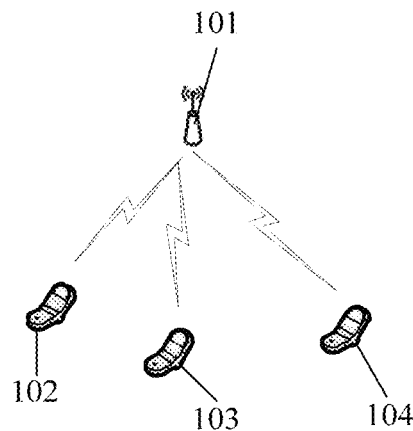
FIG. 1 is a schematic architectural diagram of a communications system to which an embodiment of the present invention is applied.

The following describes the technical solutions in the embodiments of the present invention with reference to the accompanying drawings in the embodiments of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

In the prior art, several access technologies including 2G (2nd generation), 3G (3rd generation), and 4G (4th generation) coexist. For different access technologies, a frequency band on which each technology may be deployed is defined in a standard. A particular access technology is deployed only on several specified frequency bands. When deploying these access technologies, an operator first selects a frequency band corresponding to a particular technology, where a different frequency band is selected for each technology; and then fixedly deploys the particular technology on the selected frequency band. When a user terminal uses these access technologies, frequency bands on which these technologies may be deployed are configured on the terminal first, and then the terminal searches on these frequency bands. After finding a corresponding technology, the terminal performs an access.

In a future network, an operator may select different access technologies to match requirements of different services. In addition, different access technologies may be deployed on different stations based on a requirement of a service provider and a requirement of the operator. Therefore, types and a quantity of access technologies are far more than those of existing technologies, and different access technologies may be deployed on a same frequency band. It is very difficult to standardize an access technology and a resource deployment location corresponding to the access technology. In addition, because access technologies deployed on different stations of different operators may be different, there is a great uncertainty in deployment of access technologies and services. If deployment locations of access technologies are defined in a standard, a resource waste is caused. When deployment locations of access technologies are not standardized, how to implement communication when different access technologies coexist is a problem to be resolved.

FIG. 1 is a schematic architectural diagram of a communications system to which an embodiment of the present invention is applied. As shown in FIG. 1, the communications system 100 may include a network device 101 and terminal devices 102 to 104 that are connected by means of wireless connection or wired connection or in another manner. The network device supports a plurality of access technologies, and provides a plurality of services for the terminal devices by using the plurality of access technologies.

It should be understood that, the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, a future 5G communications system, and the like.

The embodiments are described with reference to a terminal device in the present application. The terminal device may communicate with one or more core networks by using a radio access network (RAN). The terminal device may be user equipment (UE), an access terminal, a subscriber unit, a subscriber station, a mobile station, a mobile, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

The embodiments are described with reference to a network device in the present application. The network device may be a device configured to communicate with a terminal device. For example, the network device may be a base transceiver station (BTS) in a GSM system or CDMA, or a NodeB (NB) in a WCDMA system, or an evolved Node B (eNB or eNodeB) in an LTE system. Alternatively, the network device may be a relay station, an access point, an in-vehicle device, a wearable device, a network side device in a future 5G network, a network device in a future evolved public land mobile network (PLMN) network, or the like.

Figure 2:
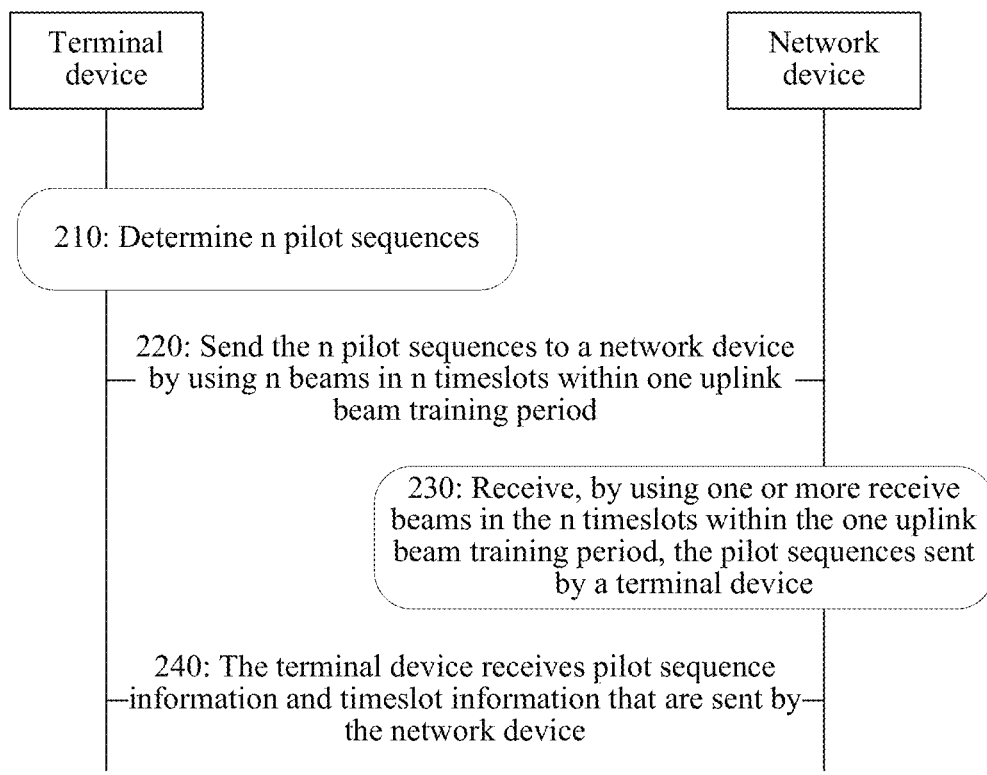
FIG. 2 is a schematic flowchart of a beam training method according to an embodiment of the present invention.

FIG. 2 is a schematic flowchart of a beam training method according to an embodiment of the present invention. The method may be applicable to the communications system in FIG. 1.

The method 200 includes the following steps.

S210: A terminal device determines n pilot sequences, where the n pilot sequences are at least partially different, and n is a positive integer greater than 1.

S220: The terminal device determines to send the n pilot sequences to a network device by using n beams in n timeslots within one uplink beam training period.

S230: The network device receives, by using one or more receive beams in the n timeslots within the uplink beam training period, the pilot sequences sent by the terminal device.

Optionally, the network device sends pilot sequence information and timeslot information to the terminal device, where the pilot sequence information is information about a pilot sequence that is in the n pilot sequences sent by the terminal device and that is received by the network device, and the timeslot information is information about a timeslot in which the pilot sequence corresponding to the pilot sequence information is sent.

The network device notifies the terminal device of the pilot sequence information and the timeslot information by using a low frequency or a known high-frequency optimal transmit beam.

Optionally, S240: The terminal device receives pilot sequence information and timeslot information that are sent by the network device.

In this embodiment of the present invention, within the uplink beam training period, the pilot sequences sent by the terminal device by using the n beams in the n timeslots to the network device are not exactly the same. Provided that pilot sequences sent in n timeslots within a same uplink beam training period by different terminal devices are exactly the same, the network devices can distinguish the different terminal devices. In addition, a quantity of combinations between different pilot sequences and the n timeslots is greater than a quantity of the pilot sequences. In this way, within a same uplink beam training period, more terminal devices can be beam-trained. Therefore, overheads of beam training are reduced.

Figure 3:
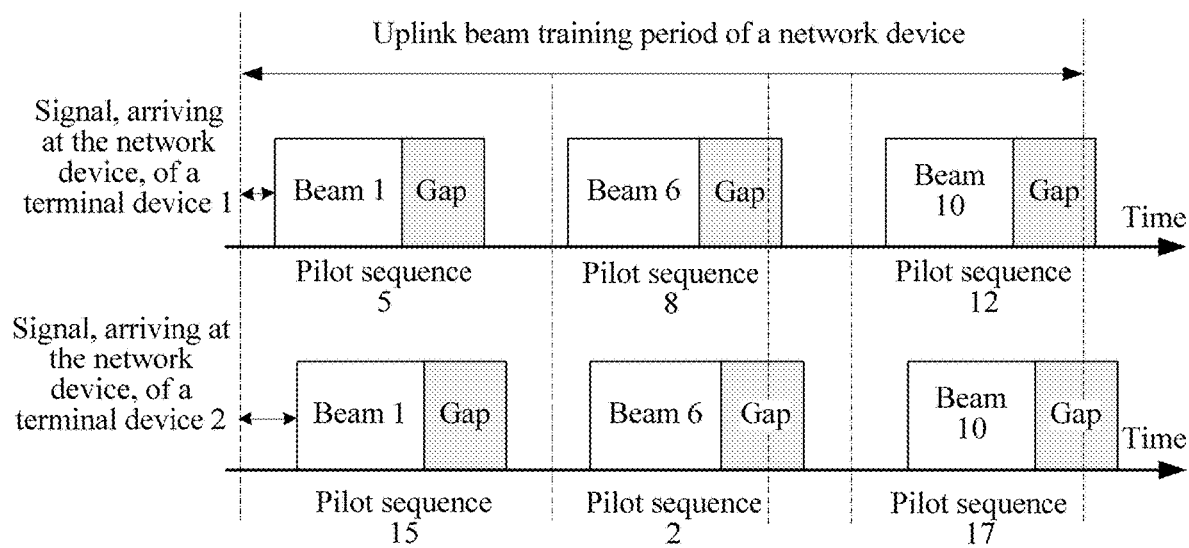
FIG. 3 is a schematic diagram of a transmit beam according to an embodiment of the present invention.

In a possible implementation, the n pilot sequences are all different, that is, a different pilot sequence sent in each timeslot. FIG. 3 is a schematic diagram of a transmit beam according to an embodiment of the present invention. Within one uplink beam training period, a terminal device 1 respectively sends pilot sequences 5, 8, and 12 by using beams 1, 6, and 10 in timeslots 1, 6, and 10. Within one uplink beam training period, a terminal device 2 respectively sends pilot sequences 15, 2, and 17 by using the beams 1, 6, and 10 in the timeslots 1, 6, and 10. There may be a guard interval (gap) between different beams.

Figure 4:
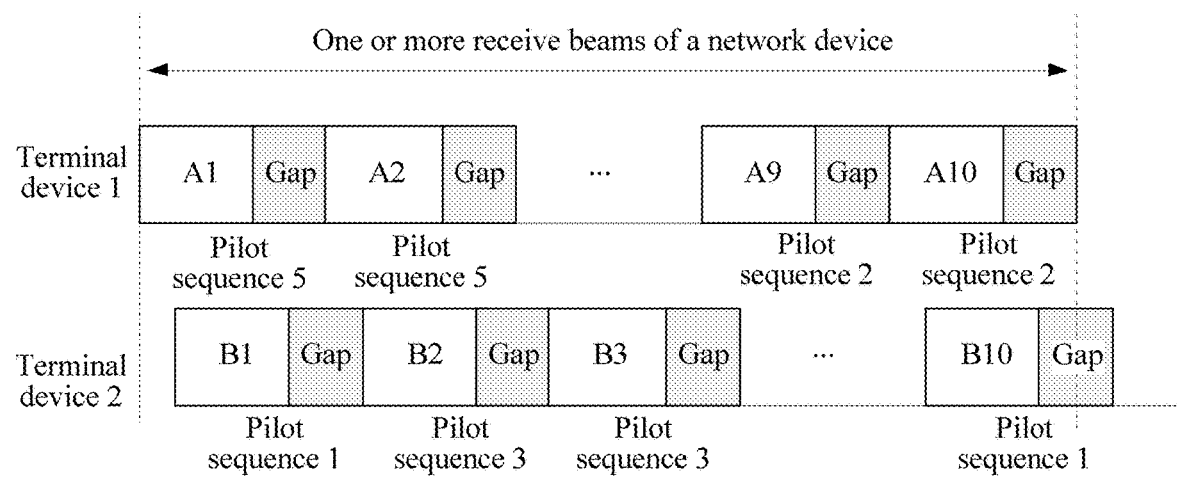
FIG. 4 is a schematic diagram of another transmit beam according to an embodiment of the present invention.

In a possible implementation, the n pilot sequences are partially different, that is, pilot sequences sent in different timeslots within the uplink beam training period may be the same. To reduce complexity of the terminal device, a plurality of beams may be grouped into one group, and use a same pilot sequence. FIG. 4 is a schematic diagram of another transmit beam according to an embodiment of the present invention. A terminal device 1 has a total of 10 transmit beams. Beams corresponding to every two neighboring timeslots are grouped into one group, and use a same pilot sequence. For a terminal device 2, beams corresponding to the first and last timeslots use a same pilot sequence, and beams corresponding to every two neighboring timeslots between the first and last timeslots use a same pilot sequence. However, pilot sequence combinations used by different terminal devices are different. This can further reduce a conflict probability.

Figure 5:
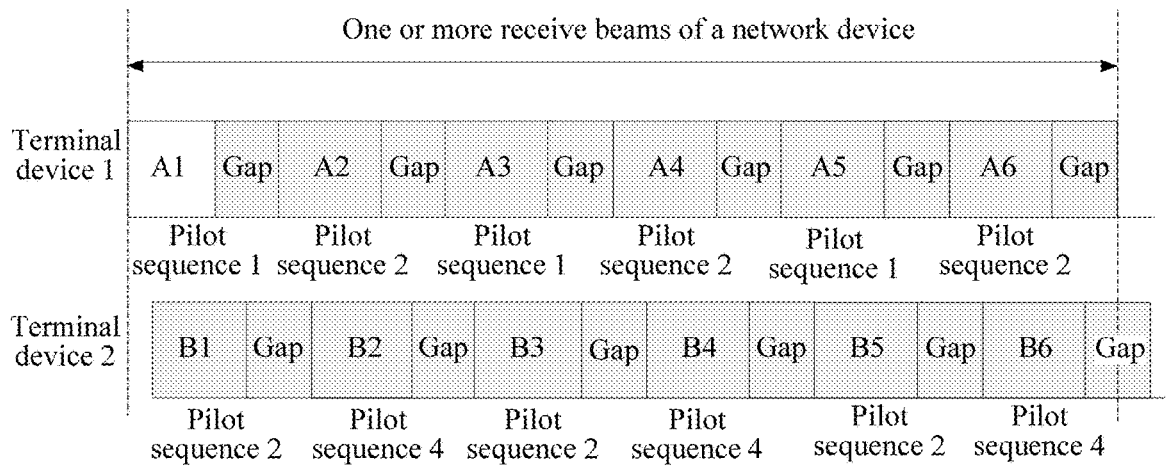
FIG. 5 is a schematic diagram of another transmit beam according to an embodiment of the present invention.

In addition to grouping of neighboring beams into one group, beams at intervals of a fixed quantity of beams may be grouped into one group. FIG. 5 is a schematic diagram of another transmit beam according to an embodiment of the present invention. There are a total of six beams. For a terminal device 1, beams A1, A3, and A5 corresponding to timeslots are grouped into one group, and use a pilot sequence 1. Beams A2, A4, and A6 corresponding to timeslots are grouped into one group, and use a pilot sequence 2. For a terminal device 2, beams B1, B3, and B5 corresponding to timeslots are grouped into one group, and use the pilot sequence 2. Beams B2, B4, and B6 corresponding to timeslots are grouped into one group, and use a pilot sequence 4. Alternatively, some beams may be randomly selected and grouped into one group, and respectively use different pilot sequences.

In a possible implementation, a network device receives, by using a same beam or different beams, a pilot sequence sent by a terminal device. If the network device can receive only a pilot sequence sent by using an optimal transmit beam, it is considered that the network device receives the signal when received signal quality is greater than a preset threshold. The network device sends, for example, broadcasts, information about the pilot sequence sent by using the optimal transmit beam and corresponding timeslot information. The information about the pilot sequence may be pilot code information corresponding to the pilot sequence. Therefore, the terminal device determines the optimal transmit beam of the terminal device based on the information sent by the network device, and subsequently accesses a network by using the optimal transmit beam, and sends a signal.

A detailed description is provided by using FIG. 3 as an example. It is assumed that, for the terminal device 1, pilot sequences in descending order of received signal quality are: pilot sequence 8>pilot sequence 5>pilot sequence 12; and for the terminal device 2, pilot sequences in descending order of received signal quality are: pilot sequence 17>pilot sequence 2>pilot sequence 15. Received signal quality of a pilot sequence may be a strength of a signal received by the network device, or the like. In this case, the optimal transmit beam of the terminal device 1 is the beam 6, and the optimal transmit beam of the terminal device 2 is the beam 10. The network device may receive the pilot sequences 8 and 17 in the timeslots 1, 6, and 10. For example, it is notified that the pilot sequence 8 is received in the training timeslot 6, and the pilot sequence 17 is received in the training timeslot 10; or it is notified that pilot code information corresponding to the pilot sequence 8 is received in the training timeslot 6, and pilot code information corresponding to the pilot sequence 17 is received in the training timeslot 10.

In another possible implementation, if the network device may receive pilot sequences sent by a same terminal device by using a plurality of transmit beams, the network device may notify information about all the received pilot sequences and corresponding timeslot information. Alternatively, information about some of the received pilot sequences and corresponding timeslot information, for example, a signal of an optimal pilot sequence and corresponding timeslot information, may be notified. Whether to notify information about some or all of the received pilot sequences and the corresponding timeslot information may be specifically determined based on whether a pilot sequence combination used by a terminal device that is beam-trained within one uplink beam training period is unique.

If the pilot sequence combination used by the terminal device that is beam-trained within the uplink beam training period is unique, the network device may notify the information about some of the received pilot sequences and the corresponding timeslot information, for example, the signal of the optimal pilot sequence and the corresponding timeslot information. For example, it is assumed that a pilot sequence combination used by each terminal device that is beam-trained within one uplink beam training period needs to be selected from the following pilot sequence combinations. The pilot sequence combination is represented by pilot codes corresponding to pilot sequences. For the eight sequences, pilot code combinations sent in any two, three, or four timeslots are different. Therefore, when detecting that the pilot sequence 1 and the pilot sequence 2 are sent in a first timeslot and a second timeslot, the network device may determine that the pilot sequence 1 and the pilot sequence 2 are from a same terminal device, and only needs to feed back which pilot sequence has optimal signal energy in the two timeslots. Similarly, when detecting that the pilot sequence 4 and the pilot sequence 1 are sent in the second timeslot and a third timeslot, the network device may determine that the pilot sequence 1 and the pilot sequence 2 are from same UE, and only needs to feed back which pilot sequence has optimal signal energy in the two timeslots.

| Pilot sequence combination 1 | 1, 2, 3, 4 |
| Pilot sequence combination 2 | 2, 3, 4, 1 |
| Pilot sequence combination 3 | 3, 4, 1, 2 |
| Pilot sequence combination 4 | 4, 1, 2, 3 |
| Pilot sequence combination 5 | 1, 4, 4, 3 |
| Pilot sequence combination 6 | 3, 1, 4, 4 |
| Pilot sequence combination 7 | 4, 3, 1, 4 |
| Pilot sequence combination 8 | 4, 4, 3, 1 |

The foregoing optional pilot sequence combinations are merely an example. Actually, a quantity of sequences satisfying that pilot sequence combinations sent in any two, three, or four timeslots are different exceeds eight. In addition, if a conventional method is used, that is, each terminal device selects one pilot sequence for sending, there are only four available options for each terminal device. If this method is used, there are at least eight available sequences when there are only four pilot sequences. Therefore, this may indicate that, the method of this embodiment increases an access success probability.

Figure 6:
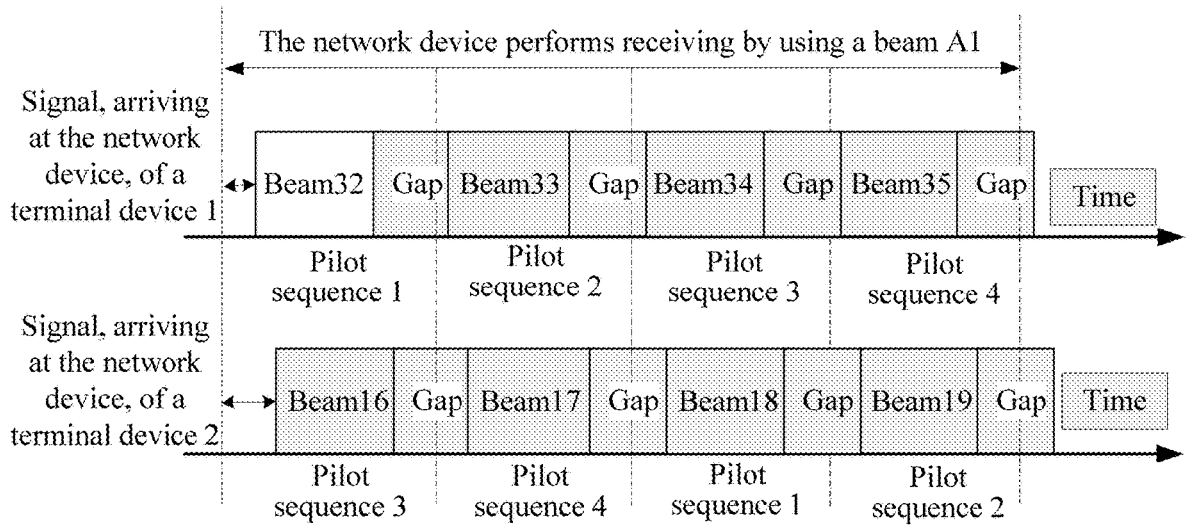
FIG. 6 is a schematic diagram of a relationship between another access technology and a corresponding resource according to an embodiment of the present invention.

If a pilot sequence combination used by a terminal device that is beam-trained within one uplink beam training period is not unique, the network device may notify the information about all the received pilot sequences and the corresponding timeslot information. In this case, because the network device cannot determine which pilot sequences are from which terminal device, the network device performs broadcasting in descending order or ascending order of received signal strength. The terminal device identifies an order of signal strength values of pilot sequences sent in timeslots by the network device, and selects a beam that matches an optimal timeslot and pilot sequence as an optimal transmit beam. For example, FIG. 6 is a schematic diagram of another transmit beam according to an embodiment of the present invention. In FIG. 6, timeslots 1, 2, 3, and 4 are shown from left to right. The network device respectively receives a pilot sequence 1 in a timeslot 1, receives pilot sequences 2 and 4 in a timeslot 2, and receives the pilot sequence 1 in a timeslot 3. In addition, received signal strengths are arranged in descending order as described above. The network device broadcasts the foregoing information. Because the terminal device 1 knows that it sends the pilot sequence 1 in a first timeslot and sends the pilot sequence 2 in a second timeslot, an optimal beam of the terminal device 1 is a beam used for sending the pilot sequence 1 in the first timeslot, that is, a transmit beam 32. Similarly, the terminal device 2 knows that it sends a pilot sequence 4 in the second timeslot and sends the pilot sequence 1 in a third timeslot, the optimal beam of the terminal device 2 is a beam used for sending the pilot sequence 4 in the second timeslot, that is, a transmit beam 17.

Figure 7:
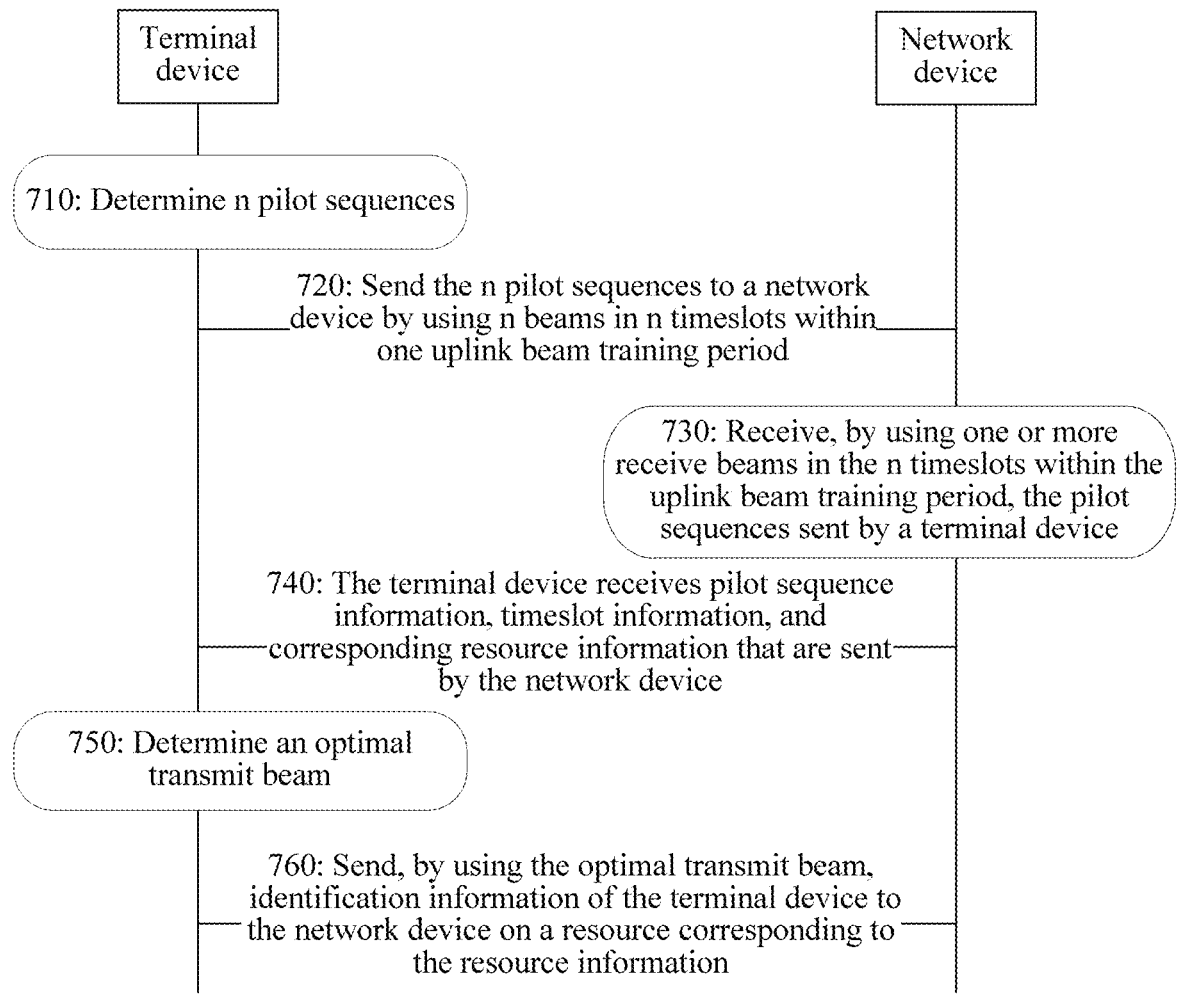
FIG. 7 is a schematic flowchart of another beam training method according to an embodiment of the present invention.

FIG. 7 is a schematic flowchart of another beam training method according to an embodiment of the present invention. The method may be applicable to the communications system in FIG. 2. The beam training method may be applicable to an uplink random access process.

The method 700 includes the following steps.

S710: A terminal device determines n pilot sequences.

The terminal device determines to send the n pilot sequences to a network device by using n beams in n timeslots within one uplink beam training period. The n pilot sequences are at least partially different, and n is a positive integer greater than 1. The n pilot sequences may be determined in two manners. One manner is that the terminal device randomly selects the n pilot sequences. The other manner is that a pilot sequence combination is selected from a preset set of pilot sequence combinations. A representation form of the pilot sequence combinations may be a set of pilot code combinations corresponding to the pilot sequence combinations. That is, a pilot code combination is selected from a preset set of pilot code combinations. The n pilot sequences are determined based on the selected pilot sequence combination or pilot code combination.

A difference between steps S720 to S740 and the foregoing steps S220 to S240 lies in that in step S740, the network device further sends resource information to the terminal device. The network device sends corresponding resource information by using a low frequency or a known high-frequency optimal transmit beam. The resource information is a resource allocated for a beam corresponding to the timeslot information. All other parts are similar, and details are not described herein again. In this embodiment, reference can be made to the content related to the embodiment corresponding to FIG. 2.

S750: The terminal device determines an optimal transmit beam. The terminal device determines the optimal transmit beam based on information about the pilot sequence and the timeslot information. For related descriptions about determining the optimal transmit beam, refer to the corresponding descriptions in FIG. 2, and details are not described herein again.

S760: The terminal device sends, by using the optimal transmit beam, identification information of the terminal device to the network device on a resource corresponding to the resource information.

After step S760, after receiving the identification information, the network device further feeds back contention resolution information to the terminal device by using the low frequency or the known high-frequency optimal transmit beam, for example, allows the terminal device to access.

In this embodiment of the present invention, within the uplink beam training period, the pilot sequences sent by the terminal device by using the n beams in the n timeslots to the network device are not exactly the same. Provided that pilot sequences sent in n timeslots within a same uplink beam training period by different terminal devices are exactly the same, the network devices can distinguish the different terminal devices. In addition, a quantity of combinations between different pilot sequences and the n timeslots is greater than a quantity of the pilot sequences. In this way, within a same uplink beam training period, more terminal devices can be beam-trained. Therefore, overheads of beam training are reduced.

Figure 8:
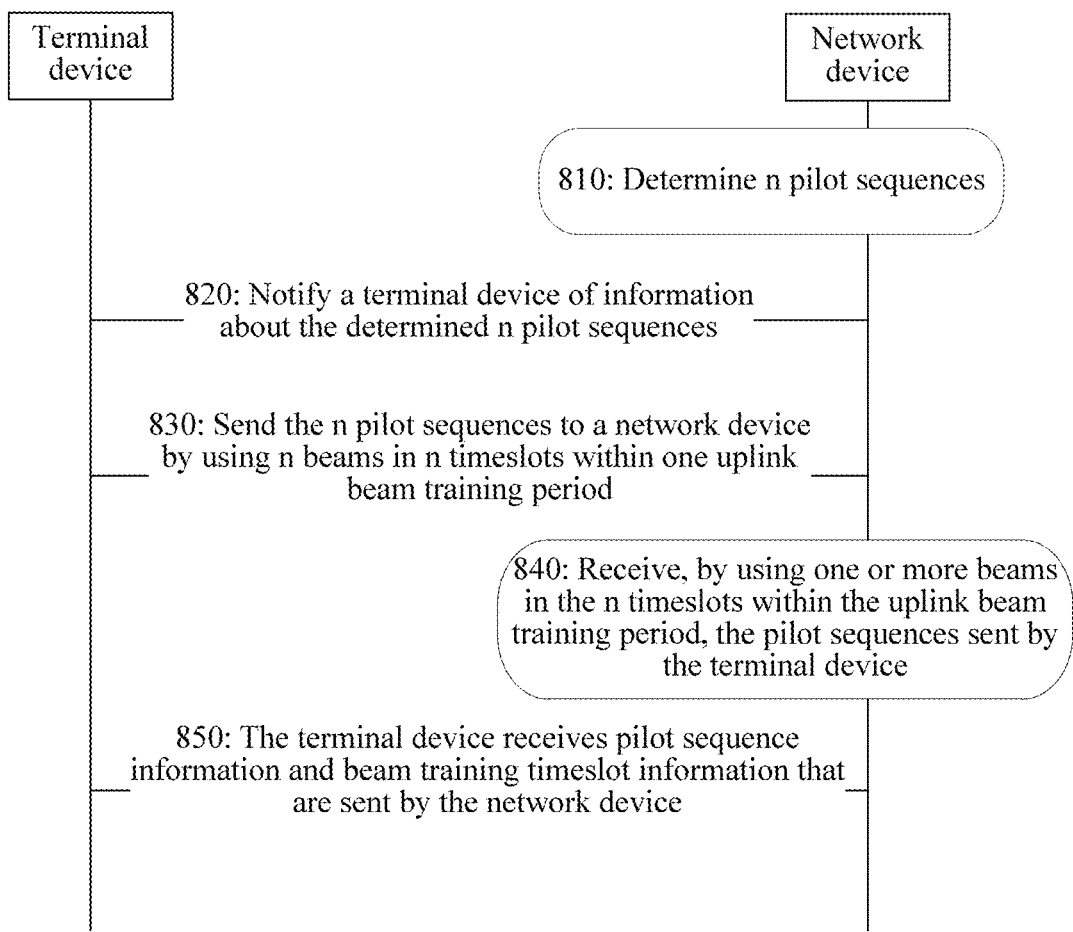
FIG. 8 is a schematic flowchart of another beam training method according to an embodiment of the present invention.

FIG. 8 is a schematic flowchart of another beam training method according to an embodiment of the present invention. The method may be applicable to the communications system in FIG. 2. The beam training method may be applicable to an uplink beam training process.

The method 800 includes the following steps.

S810: A network device determines n pilot sequences.

The network device determines, for a terminal device, the n pilot sequences to be sent to the network device by using n beams in n timeslots within one uplink beam training period. The n pilot sequences are at least partially different, and n is a positive integer greater than 1. The n pilot sequences may be determined in two manners. One manner is that the network device randomly selects the n pilot sequences. The other manner is that a pilot sequence combination is selected from a preset set of pilot sequence combinations. A representation form of the pilot sequence combinations may be a set of pilot code combinations corresponding to the pilot sequence combinations. That is, a pilot code combination is selected from a preset set of pilot code combinations. The n pilot sequences are determined based on the selected pilot sequence combination or pilot code combination.

S820: The network device notifies the terminal device of information about the determined n pilot sequences. The terminal device receives the information about the n pilot sequences that is sent by the network device, and determines the n pilot sequences based on the information.

Steps S830 to S850 are similar to the foregoing steps S220 to S240, and details are not described herein again. In this embodiment, reference can be made to the content related to the embodiment corresponding to FIG. 2.

In this embodiment of the present invention, within the uplink beam training period, the pilot sequences sent by the terminal device by using the n beams in the n timeslots to the network device are not exactly the same. Provided that pilot sequences sent in n timeslots within a same uplink beam training period by different terminal devices are exactly the same, the network devices can distinguish the different terminal devices. In addition, a quantity of combinations between different pilot sequences and the n timeslots is greater than a quantity of the pilot sequences. In this way, within a same uplink beam training period, more terminal devices can be beam-trained. Therefore, overheads of beam training are reduced.

Figure 9:
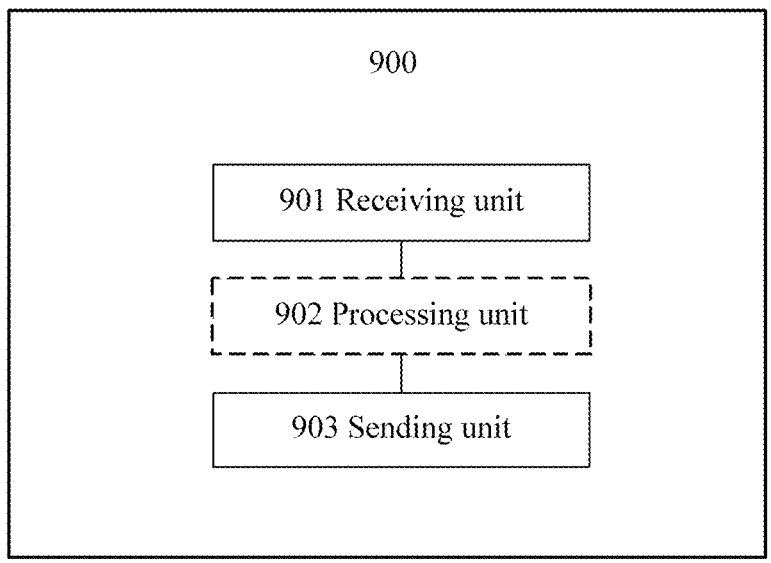
FIG. 9 is a schematic structural diagram of a terminal device according to an embodiment of the present invention.

Based on a same idea, an embodiment of the present invention provides a terminal device 900, configured to perform the method embodiments of the present invention. For related content, refer to the descriptions about the method, and details are not described herein again. The terminal device communicates with a network device provided in the embodiments of the present invention. As shown in FIG. 9:

The terminal device 900 includes a processing unit 902, a receiving unit 901, and a sending unit 903. The sending unit may be a transmitter, and the receiving unit may be a receiver.

The processing unit 902 is configured to determine n pilot sequences, where the n pilot sequences are at least partially different, and n is a positive integer greater than 1.

The sending unit is configured to send the n pilot sequences to the network device by using n beams in n timeslots within one uplink beam training period.

Optionally, the receiving unit is configured to receive pilot sequence information and timeslot information that are sent by the network device, where the pilot sequence information is information about a pilot sequence that is in the n pilot sequences and that is received by the network device, and the timeslot information is information about a timeslot in which the pilot sequence corresponding to the pilot sequence information is sent.

Optionally, if the pilot sequences are partially different, pilot sequences sent in some of the n timeslots are the same.

Optionally, the processing unit is configured to: randomly select the n pilot sequences; or select a pilot sequence combination from a preset set of pilot sequence combinations, and determine the n pilot sequences based on the selected pilot sequence combination.

In a possible implementation of this embodiment of the present invention, the receiving unit is configured to receive resource information sent by the network device, where the resource information is a resource allocated for a beam corresponding to the timeslot information.

Optionally, the processing unit is configured to determine an optimal transmit beam based on the pilot sequence information and the timeslot information; and the sending unit is configured to send, by using the optimal transmit beam, identification information of the terminal device to the network device on a resource corresponding to the resource information.

In a possible implementation of this embodiment of the present invention, the receiving unit is configured to receive information about the n pilot sequences that is sent by the network device; and the processing unit is configured to determine the n pilot sequences based on the received information about the n pilot sequences.

Optionally, the n pilot sequences are n pilot sequences randomly selected by the network device; or the n pilot sequences are determined by the network device based on a pilot sequence combination selected by the network device from a preset set of pilot sequence combinations.

In a possible implementation of this embodiment of the present invention, if the network device receives a plurality of pilot sequences, the pilot sequence information is information about a pilot sequence having highest received energy in the received pilot sequences or information about all the received pilot sequences.

In this embodiment of the present invention, within the uplink beam training period, the pilot sequences sent by the terminal device by using the n beams in the n timeslots to the network device are not exactly the same. Provided that pilot sequences sent in n timeslots within a same uplink beam training period by different terminal devices are exactly the same, the network devices can distinguish the different terminal devices. In addition, a quantity of combinations between different pilot sequences and the n timeslots is greater than a quantity of the pilot sequences. In this way, within a same uplink beam training period, more terminal devices can be beam-trained. Therefore, overheads of beam training are reduced.

Figure 10:
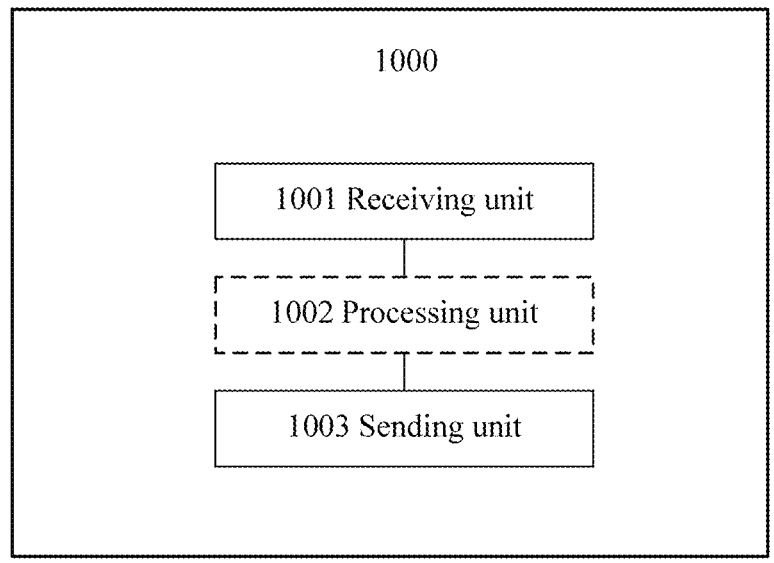
FIG. 10 is a schematic structural diagram of a network device according to an embodiment of the present invention.

Based on a same technical idea, an embodiment of the present invention provides a network device 1000, configured to perform the method in the embodiments of the present invention. For related content, refer to the descriptions about the method, and details are not described herein again. The network device communicates with a terminal device provided in the embodiments of the present invention. As shown in FIG. 10:

The network device 1000 includes: a receiving unit 1001 and a sending unit 1003. The sending unit may be a transmitter, and the receiving unit may be a receiver.

The receiving unit is configured to receive, in n timeslots within one uplink beam training period, a pilot sequence sent by the terminal device.

The sending unit is configured to send pilot sequence information and timeslot information to the terminal device, where the pilot sequence information is information about a pilot sequence that is in n pilot sequences sent by the terminal device and that is received by the network device, the timeslot information is information about a timeslot in which the pilot sequence corresponding to the pilot sequence information is sent, the n pilot sequences are at least partially different, and n is a positive integer greater than 1.

Optionally, when the pilot sequences are partially different, pilot sequences sent in some of the n timeslots are the same.

In a possible implementation of this embodiment of the present invention, the n pilot sequences are n pilot sequences randomly selected by the terminal device; or the n pilot sequences are n pilot sequences that are determined by the terminal device based on a pilot sequence combination selected by the terminal device from a preset set of pilot sequence combinations.

In a possible implementation of this embodiment of the present invention, the sending unit is configured to send resource information to the terminal device, where the resource information is a resource allocated for a beam corresponding to the timeslot information.

In a possible implementation of this embodiment of the present invention, the receiving unit is configured to receive identification information of the terminal device sent by the terminal device on a resource corresponding to the resource information by using an optimal beam, where the optimal beam is a beam determined by the terminal device based on the pilot sequence information and the timeslot information.

In a possible implementation of this embodiment of the present invention, the network device further includes a processing unit, configured to randomly select the n pilot sequences; or select, a pilot sequence combination from a preset set of pilot sequence combinations, and determine the n pilot sequences based on the selected pilot sequence combination, where the sending unit is configured to notify the user equipment of information about the n pilot sequences.

Optionally, if the network device receives a plurality of pilot sequences, the pilot sequence information is information about a pilot sequence having highest received energy in the received pilot sequences or information about all the received pilot sequences.

Figure 11:
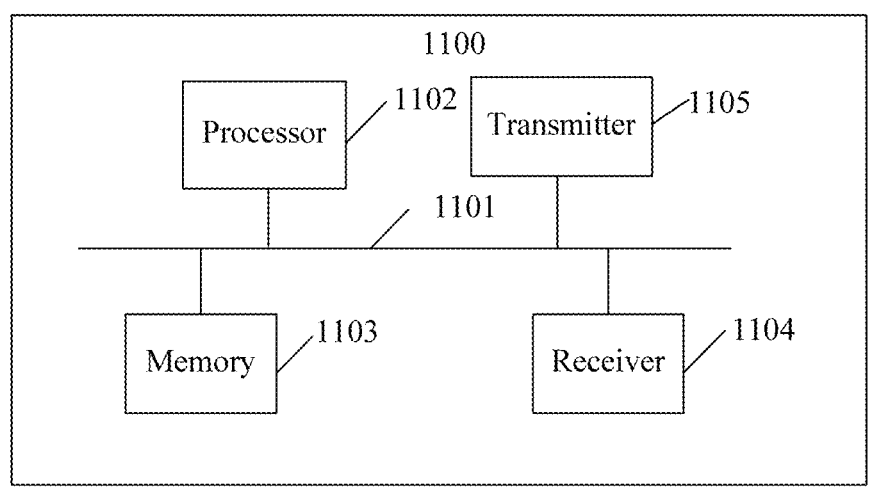
FIG. 11 is a schematic structural diagram of another terminal device according to an embodiment of the present invention.

Based on a same technical idea, an embodiment of the present invention provides a terminal device 1100, configured to perform the method in the embodiments of the present invention. For related content, refer to the descriptions about the method, and details are not described herein again. Referring to FIG. 11, the device 1100 includes: a bus 1101, and a processor 1102, a memory 1103, a receiver 1104, and a transmitter 1105 that are connected to the bus 1101. The receiver and the transmitter may be a same entity on a physical entity.

The receiver 1104 and the transmitter 1105 are configured to communicate with the network device.

The memory 1103 is configured to store an instruction.

The processor 1102 is configured to execute the instruction stored in the memory 1103, to perform the following steps when executing the instruction:

determining n pilot sequences, where the n pilot sequences are at least partially different, and n is a positive integer greater than 1; and instructing the transmitter to send the n pilot sequences to the network device by using n beams in n timeslots within one uplink beam training period; and optionally, instructing the receiver to receive pilot sequence information and timeslot information that are sent by the network device, where the pilot sequence information is information about a pilot sequence that is in the n pilot sequences and that is received by the network device, and the timeslot information is information about a timeslot in which the pilot sequence corresponding to the pilot sequence information is sent.

Optionally, in this embodiment of the present invention, if the pilot sequences are partially different, pilot sequences sent in some of the n timeslots are the same.

Optionally, in this embodiment of the present invention, the processor determines the n pilot sequences. The processor randomly selects the n pilot sequences. Alternatively, the processor selects a pilot sequence combination from a preset set of pilot sequence combinations, and determines the n pilot sequences based on the selected pilot sequence combination.

In an optional implementation, the processor instructs the receiver to receive resource information sent by the network device, where the resource information is a resource allocated for a beam corresponding to the timeslot information.

Optionally, in this embodiment of the present invention, the processor determines an optimal transmit beam based on the pilot sequence information and the timeslot information; and instructs the transmitter to send, by using the optimal transmit beam, identification information of the terminal device to the network device on a resource corresponding to the resource information.

In an optional implementation, in this embodiment of the present invention, the processor instructs the receiver to receive information about the n pilot sequences that is sent by the network device; and determines the n pilot sequences based on the received information about the n pilot sequences. Optionally, the n pilot sequences are randomly selected by the network device. Alternatively, the n pilot sequences are determined by the network device based on a pilot sequence combination selected by the terminal device from a preset set of pilot sequence combinations.

Optionally, if the network device receives a plurality of pilot sequences, the pilot sequence information is information about a pilot sequence having highest received energy in the received pilot sequences or information about all the received pilot sequences.

Figure 12:
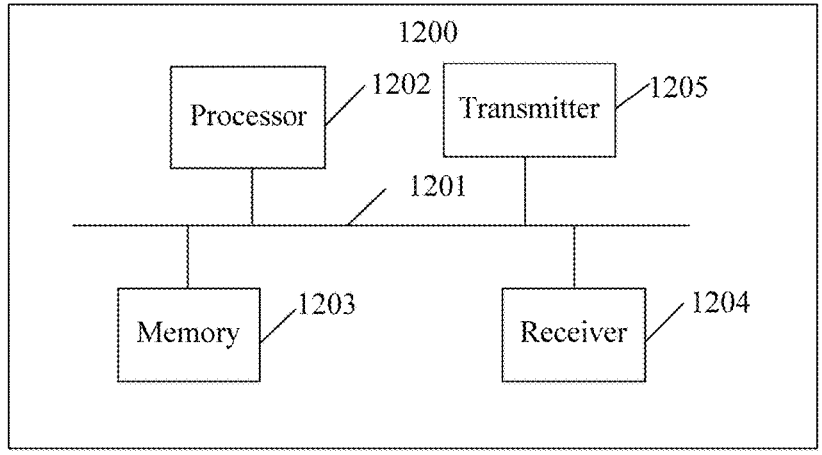
FIG. 12 is a schematic structural diagram of another network device according to an embodiment of the present invention.

Based on a same technical idea, an embodiment of the present invention provides a network device 1200, configured to perform the method in the embodiments of the present invention. For related content, refer to the descriptions about the method, and details are not described herein again. Referring to FIG. 12, the network device 1200 includes: a bus 1201, and a processor 1202, a memory 1203, a receiver 1204, and a transmitter 1205 that are connected to the bus 1201. The receiver and the transmitter may be a same entity on a physical entity.

The receiver 1204 and the transmitter 1205 are configured to communicate with the terminal device.

The memory 1203 is configured to store an instruction.

The processor 1202 is configured to execute the instruction stored in the memory 1203, to perform the following steps when executing the instruction:

instructing, by the processor, the receiver to receive, in n timeslots within one uplink beam training period, a pilot sequence sent by the terminal device; and instructing, by the processor, the transmitter of the network device to send pilot sequence information and timeslot information to the terminal device, where the pilot sequence information is information about a pilot sequence that is in n pilot sequences sent by the terminal device and that is received by the network device, the timeslot information is information about a timeslot in which the pilot sequence corresponding to the pilot sequence information is sent, the n pilot sequences are at least partially different, and n is a positive integer greater than 1.

In a possible implementation, if the pilot sequences are partially different, pilot sequences sent in some of the n timeslots are the same.

Optionally, the n pilot sequences are n pilot sequences randomly selected by the terminal device; or the n pilot sequences are n pilot sequences that are determined by the terminal device based on a pilot sequence combination selected by the terminal device from a preset set of pilot sequence combinations.

Optionally, the processor instructs the transmitter to send resource information to the terminal device, where the resource information is a resource allocated for a beam corresponding to the timeslot information.

Optionally, the processor instructs the receiver to receive identification information of the terminal device sent by the terminal device on a resource corresponding to the resource information by using an optimal beam, where the optimal beam is a beam determined by the terminal device based on the pilot sequence information and the timeslot information.

Optionally, the processor randomly selects the n pilot sequences; or the processor selects a pilot sequence combination from a preset set of pilot sequence combinations, and determines the n pilot sequences based on the selected pilot sequence combination; and the network device notifies the user equipment of information about the n pilot sequences.

Optionally, if the network device receives a plurality of pilot sequences, the pilot sequence information is information about a pilot sequence having highest received energy in the received pilot sequences or information about all the received pilot sequences.

Figure 13:
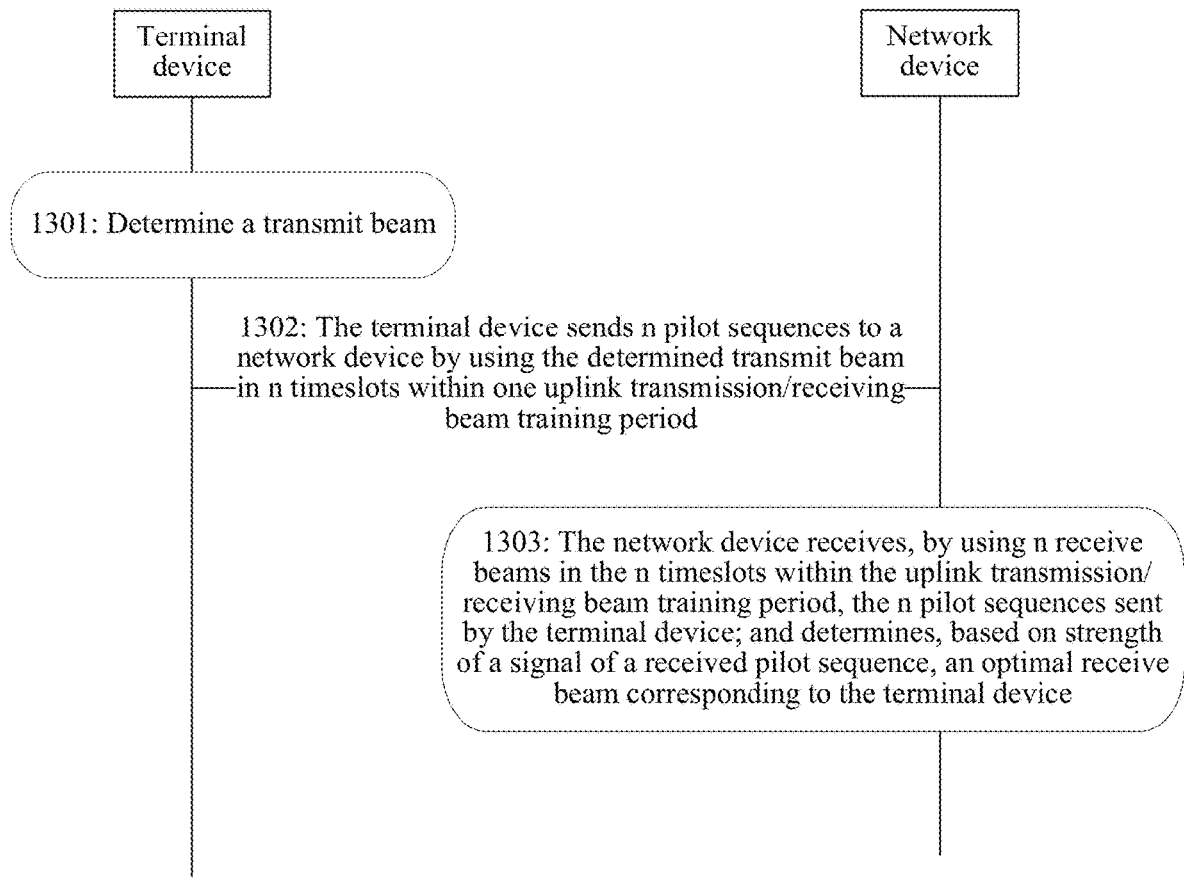
FIG. 13 is a schematic flowchart of a beam training method according to an embodiment of the present invention.

FIG. 13 is a schematic flowchart of a beam training method according to an embodiment of the present invention. The method may be applicable to the communications system in FIG. 2. The method may be applicable to training of uplink user-equipment transmit beams, training of uplink base-station receive beams, or training of the two.

The method 1300 includes the following steps.

S1301: A terminal device determines a transmit beam.

S1302: The terminal device sends n pilot sequences to a network device by using the determined transmit beam in n timeslots within one uplink transmission/receiving beam training period, where the n pilot sequences are at least partially different, and n is a positive integer greater than 1.

S1303: The network device receives, by using n receive beams in the n timeslots within the uplink transmission/receiving beam training period, the n pilot sequences sent by the terminal device; and determines, based on strengths of signals of the received pilot sequences, an optimal receive beam corresponding to the terminal device.

That the network device receives a pilot sequence means that a strength of a signal of the received pilot sequence exceeds a threshold. A receive beam that receives a highest signal strength is determined as an optimal receive beam.

Optionally, when the n pilot sequences are partially different, pilot sequences sent in some of the n timeslots are the same. That is, the pilot sequences are reused. In this embodiment of the present invention, the reuse of the pilot sequences is the same as that in the embodiment corresponding to FIG. 2. For specific content, refer to the foregoing embodiment. Details are not described herein again.

Based on a same idea, an embodiment of the present invention provides a terminal device, configured to perform the method embodiments of the present invention. For related content, refer to the descriptions about the method, and details are not described herein again. The terminal device communicates with a network device provided in the embodiments of the present invention.

The terminal device includes: a processing unit, configured to determine a transmit beam; and a sending unit, configured to send n pilot sequences to the network device by using the determined transmit beam in n timeslots within one uplink transmission/receiving beam training period, where the n pilot sequences are at least partially different, and n is a positive integer greater than 1.

Optionally, if the n pilot sequences are partially different, pilot sequences sent in some of the n timeslots are the same.

Based on a same idea, an embodiment of the present invention provides a network device, configured to perform the method embodiments of the present invention. For related content, refer to the descriptions about the method, and details are not described herein again. The network device communicates with a terminal device provided in the embodiments of the present invention.

The network device includes: a receiving unit, configured to receive, by using n receive beams in n timeslots within one uplink transmission/receiving beam training period, n pilot sequences sent by the terminal device, where the n pilot sequences are at least partially different, and n is a positive integer greater than 1.

The processing unit is configured to determine, based on strengths of signals of the received pilot sequences, an optimal receive beam corresponding to the terminal device.

Optionally, when the n pilot sequences are partially different, pilot sequences sent in some of the n timeslots are the same.

Based on a same technical idea, an embodiment of the present invention provides a terminal device, configured to perform the method in the embodiments of the present invention. For related content, refer to the descriptions about the method, and details are not described herein again. The terminal device includes: a bus, and a processor, a memory, and a transmitter that are connected to the bus.

The transmitter is configured to communicate with a network device.

The memory is configured to store an instruction.

The processor is configured to execute the instruction stored in the memory, to perform the following steps when executing the instruction: determining, by the processor, a transmit beam; and instructing, by the processor, the transmitter to send n pilot sequences to the network device by using the determined transmit beam in n timeslots within one uplink transmission/receiving beam training period, where the n pilot sequences are at least partially different, and n is a positive integer greater than 1.

Optionally, when the n pilot sequences are partially different, pilot sequences sent in some of the n timeslots are the same.

Based on a same technical idea, an embodiment of the present invention provides a network device, configured to perform the method in the embodiments of the present invention. For related content, refer to the descriptions about the method, and details are not described herein again. The network device includes: a bus, and a processor, a memory, and a receiver that are connected to the bus.

The receiver is configured to communicate with a terminal device.

The memory is configured to store an instruction.

The processor is configured to execute the instruction stored in the memory, to perform the following steps when executing the instruction: instructing, by the processor, the receiver to receive, by using n receive beams in n timeslots within one uplink transmission/receiving beam training period, n pilot sequences sent by the terminal device, where the n pilot sequences are at least partially different, and n is a positive integer greater than 1; and determining, by the processor based on strengths of signals of the received pilot sequences, an optimal receive beam corresponding to the terminal device.

Optionally, when the n pilot sequences are partially different, pilot sequences sent in some of the n timeslots are the same.

It should be noted that, the foregoing processor may be a processing unit, or may be a collective term of a plurality of processing units. For example, the processor may be a central processing unit (CPU), or may be an application-specific integrated circuit (ASIC), or may be one or more integrated circuits configured to implement this embodiment of the present invention, for example, one or more microprocessors (digital signal processor (DSP)), or one or more field programmable gate arrays (FPGA).

The memory may be a storage apparatus, or may be a collective term of a plurality of storage components, and is configured to store executable program code, a parameter and data required by running of a resident access network device or terminal, and the like. In addition, the memory may include a random-access memory (RAM), or may include a non-volatile memory (NVM), such as a magnetic disk memory, a flash memory, or the like.

The bus may be an industry standard architecture (ISA) bus, a peripheral component interconnect (PCI) bus, an Extended Industry Standard Architecture (EISA) bus, or the like. The bus may include an address bus, a data bus, a control bus, and the like. For convenience of illustration, the bus is denoted by only one line in the figure, but it does not indicate that there is only one bus or one type of bus.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A beam training method, comprising:
   determining, by a terminal device, n pilot sequences, wherein the n pilot sequences are at least partially different, and n is a positive integer greater than 1;
   sending, by the terminal device, the determined n pilot sequences to a network device by using n different beams in n timeslots within one uplink beam training period, wherein a quantity of combinations between different pilot sequences and the n timeslots is greater than a quantity of the n pilot sequences;
   receiving, by the terminal device, information from the network device, wherein the information includes: pilot sequence information about at least some of the n pilot sequences received at the network device, and timeslot information about the timeslots of the n timeslots in which the at least some of the n pilot sequences were sent by the terminal device, wherein the information received by the terminal device from the network device further includes: the signal of an optimal pilot sequence of the at least some of the n pilot sequences, and the corresponding timeslot information, and wherein the optimal pilot sequence is a unique pilot sequence of the n pilot sequences;
   determining, by the terminal device, an optimal transmit beam of the n different beams based on the information received from the network device; and
   accessing, by the terminal device, a network using the optimal transmit beam.

2. The method according to claim 1, wherein n is greater than 2.

3. The method according to claim 1, further comprising:
   receiving, by the terminal device, resource information from the network device, wherein the resource information comprises a resource allocated for a beam corresponding to the timeslot information.

4. The method according to claim 1, wherein determining the n pilot sequences comprises:
   receiving, by the terminal device, information about the n pilot sequences from the network device; and
   determining the n pilot sequences based on the received information about the n pilot sequences.

5. The method according to claim 1, wherein if the network device receives a plurality of pilot sequences, the pilot sequence information is information about a pilot sequence having highest received energy in the pilot sequences received at the network device or information about all the received pilot sequences.

6. A beam training method, comprising:
   receiving, by a network device, n pilot sequences from a terminal device, wherein the n pilot sequences are determined by the terminal device and are sent by the terminal device to the network device by using n different beams in n timeslots within one uplink beam training period, wherein the n pilot sequences are at least partially different, and n is a positive integer greater than 1, and wherein a quantity of combinations between different pilot sequences and then timeslots is greater than a quantity of the n pilot sequences; and
   sending, by the network device, information to the terminal device, wherein the information includes: pilot sequence information about at least some of the n pilot sequences sent by the terminal device, and timeslot information about the timeslots of the n timeslots in which the at least some of the n pilot sequences were received by the network device, wherein the information sent by the network device further includes: the signal of an optimal pilot sequence of the at least some of the n pilot sequences, and the corresponding timeslot information, and wherein the optimal pilot sequence is a unique pilot sequence of the n pilot sequences,
   wherein the network device sends the information to the terminal device to enable the terminal device to: determine an optimal transmit beam of the n different beams based on the information sent by the network device, and access a network using the optimal transmit beam.

7. The method according to claim 6, further comprising:
   sending, by the network device, resource information to the terminal device, wherein the resource information comprises a resource allocated for a beam corresponding to the timeslot information.

8. The method according to claim 7, further comprising:
   receiving, by the network device, identification information of the terminal device from the terminal device on a resource corresponding to the resource information by using the optimal beam determined by the terminal device.

9. The method according to claim 6, further comprising:
   randomly selecting, by the network device, the n pilot sequences; or selecting, by the network device, a pilot sequence combination from a preset set of pilot sequence combinations, and determining the n pilot sequences based on the selected pilot sequence combination; and
   notifying, by the network device, the terminal device of information about the n pilot sequences.

10. The method according to claim 6, wherein the pilot sequence information comprises information about a pilot sequence having highest received energy in the received pilot sequences or information about all the received pilot sequences.

11. A terminal device, comprising:
    a processor, configured to determine n pilot sequences, wherein the n pilot sequences are at least partially different, and n is a positive integer greater than 1;
    a transmitter, configured to send the determined n pilot sequences to a network device by using n different beams in n timeslots within one uplink beam training period, wherein a quantity of combinations between different pilot sequences and the n timeslots is greater than a quantity of the n pilot sequences; and
    a receiver, configured to receive information from the network device, wherein the information includes: pilot sequence information about at least some of the n pilot sequences received at the network device, and timeslot information about the timeslots of the n timeslots in which the at least some of the n pilot sequences were sent by the transmitter, wherein the information received by the receiver from the network device further includes: the signal of an optimal pilot sequence of the at least some of the n pilot sequences, and the corresponding timeslot information, and wherein the optimal pilot sequence is a unique pilot sequence of the n pilot sequences,
    wherein the processor is further configured to determine, based on the information received from the network device, an optimal transmit beam of the n different beams for use by the terminal device in accessing a network.

12. The terminal device according to claim 11, wherein n is greater than two.

13. The terminal device according to claim 11, wherein the receiver is further configured to receive resource information from the network device, wherein the resource information comprises a resource allocated for a beam corresponding to the timeslot information.

14. The terminal device according to claim 13, wherein:
the transmitter is further configured to send, by using the optimal transmit beam, identification information of the terminal device to the network device on a resource corresponding to the resource information.

15. The terminal device according to claim 11, wherein:
the receiver is further configured to receive information about the n pilot sequences from the network device; and
the processing unit is further configured to determine the n pilot sequences based on the received information about the n pilot sequences.

16. A network device, comprising:
a receiver, configured to receive, n pilot sequences from a terminal device, wherein the n pilot sequences are determined by the terminal device and are sent by the terminal device to the network device by using n different beams in n timeslots within one uplink beam training period, wherein the n pilot sequences are at least partially different, and n is a positive integer greater than 1, and wherein a quantity of combinations between different pilot sequences and the n timeslots is greater than a quantity of the n pilot sequences; and
a transmitter, configured to send information to the terminal device, wherein the information includes: pilot sequence information about at least some of the n pilot sequences sent by the terminal device, and timeslot information about the timeslots of the n timeslots in which the at least some of the n pilot sequences were received by the receiver, wherein the information sent by the transmitter further includes: the signal of an optimal pilot sequence of the at least some of the n pilot sequences, and the corresponding timeslot information, and wherein the optimal pilot sequence is a unique pilot sequence of the n pilot sequences,
wherein the transmitter sends the information to the terminal device to enable the terminal device to: determine an optimal transmit beam of the n different beams based on the information sent by the transmitter, and access a network using the optimal transmit beam.

17. The network device according to claim 16, wherein the transmitter is configured to send resource information to the terminal device, wherein the resource information comprises a resource allocated for a beam corresponding to the timeslot information.

18. The network device according to claim 17, wherein the receiver is further configured to:
receive identification information of the terminal device on a resource corresponding to the resource information by using the optimal beam.

19. The network device according to claim 16, further comprising:
a processing unit, configured to: randomly select the n pilot sequences; or select, a pilot sequence combination from a preset set of pilot sequence combinations, and determine the n pilot sequences based on the selected pilot sequence combination,
wherein the transmitter is further configured to notify the terminal equipment of information about the n pilot sequences.

20. The network device according to claim 19, wherein the pilot sequence information is information about a pilot sequence having highest received energy in the received pilot sequences or information about all the received pilot sequences.

* * * * *

UNITED STATES PATENT AND TRADEMARK OFFICE
CERTIFICATE OF CORRECTION

PATENT NO. : 10,735,069 B2
APPLICATION NO. : 16/023750
DATED : August 4, 2020
INVENTOR(S) : Huang et al.

Page 1 of 1

It is certified that error appears in the above-identified patent and that said Letters Patent is hereby corrected as shown below:

In the Claims

Claim 6, Column 19, Line 58: "between different pilot sequences and then timeslots is" should read -- between different pilot sequences and the n timeslots is --.

Signed and Sealed this
Second Day of November, 2021

Drew Hirshfeld
*Performing the Functions and Duties of the
Under Secretary of Commerce for Intellectual Property and
Director of the United States Patent and Trademark Office*